(12) United States Patent
Bush et al.

(10) Patent No.: US 7,831,961 B1
(45) Date of Patent: Nov. 9, 2010

(54) COOPERATIVE PREEMPTION MECHANISM FOR GARBAGE-COLLECTED MULTI-THREADED COMPUTATION

(75) Inventors: William Bush, San Mateo, CA (US); Mario I. Wolczko, San Carlos, CA (US); Marc Tremblay, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 1013 days.

(21) Appl. No.: 11/373,949

(22) Filed: Mar. 13, 2006

Related U.S. Application Data

(63) Continuation of application No. 09/986,231, filed on Oct. 22, 2001, now Pat. No. 7,013,454, which is a continuation-in-part of application No. 09/255,226, filed on Feb. 22, 1999, now Pat. No. 6,308,319.

(51) Int. Cl.
*G06F 9/44* (2006.01)
*G06F 12/00* (2006.01)

(52) U.S. Cl. .................................... 717/124; 707/813

(58) Field of Classification Search ............ 717/124
See application file for complete search history.

(56) References Cited

U.S. PATENT DOCUMENTS

| | | | |
|---|---|---|---|
| 5,088,036 A | 2/1992 | Ellis et al. | |
| 5,321,834 A | 6/1994 | Weiser et al. | |
| 5,557,771 A | 9/1996 | Kawaguchi et al. | |
| 5,560,003 A | 9/1996 | Nilsen et al. | |
| 5,560,028 A | 9/1996 | Sachs et al. | |
| 5,842,016 A * | 11/1998 | Toutonghi et al. | 718/106 |
| 5,920,876 A | 7/1999 | Ungar et al. | |
| 5,930,508 A | 7/1999 | Faraboschi et al. | |
| 5,953,736 A | 9/1999 | O'Connor et al. | |
| 6,052,699 A | 4/2000 | Huelsbergen et al. | |
| 6,094,663 A | 7/2000 | Snow et al. | |
| 6,098,089 A | 8/2000 | O'Connor et al. | |
| 6,101,580 A | 8/2000 | Agesen et al. | |

(Continued)

OTHER PUBLICATIONS

"Compiler Support for Garbage Collection in a Statically Typed Language", Amer Diwan et al., Jul. 1992, ACM SIGPLAN, vol. 27, Issue 7, pp. 273-282.*

(Continued)

*Primary Examiner*—Wei Y Zhen
*Assistant Examiner*—Lanny Ung
(74) *Attorney, Agent, or Firm*—Gregory P. Durbin; Polsinelli Shughart PC

(57) ABSTRACT

By encoding an exception triggering value in storage referenced by an instruction in an otherwise unused slot (e.g., the delay slot of a delayed control transfer instruction or an unused instruction position in a VLIW-based architecture) coinciding with a safe point, an efficient coordination mechanism can be provided for multi-threaded code. Because the mechanism(s) impose negligible overhead when not employed and can be engaged in response to an event (e.g., a start garbage collection event), safe points can be defined at call, return and/or backward branch points throughout mutator code to reduce the latency between the event and suspension of all threads. Though particularly advantageous for thread suspension to perform garbage collection at safe points, the techniques described herein are more generally applicable to program suspension at coordination points coinciding with calls, returns, branches or calls, returns and branches therein.

16 Claims, 6 Drawing Sheets

U.S. PATENT DOCUMENTS

| | | | |
|---|---|---|---|
| 6,125,434 | A | 9/2000 | Willard et al. |
| 6,199,075 | B1 * | 3/2001 | Ungar et al. ............... 707/206 |
| 6,308,319 | B1 * | 10/2001 | Bush et al. ................. 717/141 |
| 6,341,293 | B1 | 1/2002 | Hennessey |
| 6,421,689 | B1 | 7/2002 | Benson et al. |
| 6,446,257 | B1 | 9/2002 | Pradhan et al. |
| 6,598,141 | B1 | 7/2003 | Dussud et al. |
| 6,738,893 | B1 | 5/2004 | Rozas |
| 6,799,266 | B1 | 9/2004 | Stotzer et al. |
| 6,842,853 | B1 | 1/2005 | Bush et al. |
| 6,845,385 | B1 | 1/2005 | Hennessey |
| 6,862,635 | B1 | 3/2005 | Alverson |
| 6,912,553 | B1 | 6/2005 | Kolodner et al. |
| 7,013,454 | B2 * | 3/2006 | Bush et al. ................. 717/124 |
| 2002/0029357 | A1 | 3/2002 | Charnell |

OTHER PUBLICATIONS

"Efficient JavaVM Just-in-Time Compilation", Andreas Krall, Oct. 1998, PACT'98, IEEE Computer Society, pp. 1-8.*

Click, C. et al., "The Pauseless GC Algorithm," VEE Conference, Jun. 11-12, 2005, ACM, New York, NY, pp. 46-56.

Appel, "Modern Compiler Implementation in C: Basic Techniques," Cambridge University Press, pp. 125-149 and pp. 291-297, 1998.

Author Unknown, "MAJC™ Architecture Tutorial," Sun Microsystems, Inc., White Paper, 18 pages, Sep. 1999.

Boehm, Hans J., "Simple Garbage-Collector-Safety," ACM, pp. 89-98, 1996.

Cramer et al., "Compiling Java Just In Time," IEEE, vol. 17, Issue 3, pp. 36-43, May-Jun. 1997.

De Gloria et al., "A Programmable Instruction Format Extension to VLIW Architectures," IEEE, pp. 35-40, 1992.

Jones et al., "Garbage Collection: Algorithms for Automatic Dynamic Memory Management," Wiley, pp. 1-41, 1996.

Jouppi, Norman P., "Available Instruction-Level Parallelism for Superscalar and Superpipelined machines," ACM, pp. 272-282, 1989.

Kuechlin et al., "On Multi-Threaded List-Processing and Garbage Collection," Proceedings of the Third IEEE Symposium on Parallel and Distributed Processing, pp. 894-897, Dec. 2-5, 1991.

Sansom et al., "Generation garbage collection for Haskell," Proceedings of the Conference on Functional Programming Languages and Computer Architecture, ACM-FPCA'93, Copenhagen Denmark, pp. 106-116, Jun. 9-11, 1993.

Schmidt et al., "Performance of a Hardware-Assisted Real-Time Garbage Collector," ACM, pp. 76-85, 1994.

Sudharsanan, Subramania, "MAJC-5200: A High Performance Microprocessor for Multimedia Computing," IPDPS 2000 Workshop on Parallel and Distributed Computing in Image Processing, Video Processing, and Multimedia, 4 pages, 2000.

Weaver et al., "The SPARC Architecture Manual Version 9," Prentice-Hall, Inc. pp. 237-238, 1994.

* cited by examiner

COOPERATIVE PREEMPTION MECHANISM FOR GARBAGE-COLLECTED MULTI-THREADED COMPUTATION

CROSS-REFERENCE TO RELATED APPLICATIONS

This application is a continuation of U.S. application Ser. No. 09/986,231, filed Oct. 22, 2001, which is in turn a continuation-in-part of U.S. application Ser. No. 09/255,226, filed Feb. 22, 1999, now U.S. Pat. No. 6,308,319.

BACKGROUND

1. Field of the Invention

The present invention relates to synchronization amongst execution sequences in computer programs and, in some applications thereof, to techniques for facilitating garbage collection in multi-threaded software environments.

2. Description of the Related Art

Traditionally, most programming languages have placed responsibility for dynamic allocation and deallocation of memory on the programmer. For example, in the C programming language, memory is allocated from the heap by the malloc procedure (or its variants). Given a pointer variable, p, execution of machine instructions corresponding to the statement p=malloc (sizeof (SomeStruct)) causes pointer variable p to point to newly allocated storage for a memory object of size necessary for representing a SomeStruct data structure. After use, the memory object identified by pointer variable p can be deallocated, or freed, by calling free (p). Pascal and C++ languages provide analogous facilities for explicit allocation and deallocation of memory.

Unfortunately, dynamically allocated storage becomes unreachable when no chain of references (or pointers) can be traced from a "root set" of references (or pointers) to the storage. Memory objects that are no longer reachable, but have not been freed, are called garbage. Similarly, storage associated with a memory object can be deallocated while still referenced. In this case, a dangling reference has been created. In general, dynamic memory can be hard to manage correctly. In most programming languages, heap allocation is required for data structures that survive the procedure that created them. If these data structures are passed to further procedures or functions, it may be difficult or impossible for the programmer or compiler to determine the point at which it is safe to deallocate them.

Because of this difficulty, garbage collection, i.e., automatic reclamation of heap-allocated storage after its last use by a program, can be an attractive alternative model of dynamic memory management. Garbage collection is particularly attractive for languages such as the Java™ language (Java™ and all Java™—based marks and logos are trademarks or registered trademarks of Sun Microsystems, Inc. in the United States and other countries), Prolog, Lisp, Smalltalk, Scheme, Eiffel, Dylan, M L, Haskell, Miranda, etc. See generally, Jones & Lins, Garbage Collection: Algorithms for Automatic Dynamic Memory Management, pp. 1-41, Wiley (1996) for a discussion of garbage collection and of various classical algorithms for performing garbage collection.

In general, garbage collection methods can be described with reference to a garbage collection strategy implemented by a "collector" and its interaction or coordination with a useful computation—a "mutator"—that changes the state of heap-allocated storage. Many collector implementations, including some mark-sweep and copying collector implementations, are based on a stop-start approach, i.e., they involve suspending the mutator, collecting garbage, and resuming execution of the mutator after garbage collection. In such implementations, garbage collection is performed when the "root set" of pointers to dynamically allocated memory locations referenceable by the mutator is available to the garbage collector. A mutator in this state is called "consistent," and one that is not is "inconsistent."

Typically, a compiler for a garbage-collected language supports the collector by generating code that allocates objects, by describing storage locations that make up the root set, and by describing the layout of objects allocated from the heap. For efficiency, compilers typically generate code that uses registers and/or stack locations provided by a target processor architecture. As a result, execution of compiled code puts pointers in such registers or stack locations. Unfortunately, a mutator running such code is generally inconsistent, because the exact set of registers and/or stack locations containing pointers can change with every instruction. The overhead of exactly maintaining a root set description at each instruction tends to defeat the purpose of using registers and stack locations in the first place. Compilers therefore identify safe points in the code, places in the code where the compiler emits information describing which registers and stack locations contain pointers. When a mutator is suspended at a safe point it is consistent and hence garbage collection can proceed. See generally, Appel, *Modern Compiler Implementation in C: Basic Techniques*, pp. 291-297, Cambridge University Press (1998) for a description of compiler support for garbage collection.

Accordingly, a mechanism is desired by which a processor executing mutator code may suspend execution at a safe point defined therein to facilitate garbage collection. A desirable mechanism is computationally efficient and imposes minimal overhead on the mutator computation. Furthermore, it is desirable for the mechanism to operate in the context of multi-threaded mutator computation and to limit the delay between a request to start garbage collection and suspension of all threads of the mutator computation.

SUMMARY

Encoding an exception triggering value in storage referenced by an instruction in an otherwise unused slot (e.g., the delay slot of a delayed control transfer instruction or an unused instruction position in a VLIW-based architecture) coinciding with a safe point provides an efficient coordination mechanism for multi-threaded code. Because the mechanism(s) impose negligible overhead when not employed and can be engaged in response to an event (e.g., a start garbage collection event), safe points can be defined at call, return and/or backward branch points throughout mutator code to reduce the latency between the event and suspension of all threads. In contrast, mechanisms based on conditional execution of suspension code can impose substantial overhead. Furthermore, unlike mechanisms based on self-modifying code, complexities associated with maintaining memory model consistency are avoided. Though particularly advantageous for thread suspension to perform garbage collection at safe points, the techniques described herein are more generally applicable to program suspension at coordination points coinciding with calls, returns, branches or combinations thereof.

Illustrative embodiments in accordance with the present invention exploit a variety of exception triggering instructions and configurations of storage referenced thereby to suspend threads at safe points coinciding with call, return and/or backward branch sites. Some embodiments in accordance with the present invention include support for garbage collection. Some embodiments in accordance with the present invention include compiler techniques and implementations to generate suitable execution sequences of instructions.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

To facilitate garbage collection, it is desirable to provide a mechanism by which threads of a mutator can be efficiently suspended at safe points. Conditional execution of suspension code at such safe points is one technique. For example, at selected safe points in mutator code, a compiler can insert instructions that check a flag that is set when garbage collection is desired and cleared when the garbage collection has completed. If the flag is set, the suspension code is run to suspend the mutator. This technique can be described as "polling at safe points." Unfortunately, the polling technique introduces substantial overhead. A flag test must be performed at every safe point and millions of safe points will typically be traversed between garbage collection cycles. Extra flag test and branch instructions degrade performance, increase code size and consume processor resources such as instruction cache space and flags.

Another technique involves self-modifying code. When garbage collection becomes necessary or is desired, all threads are suspended, and every currently executing method (i.e., the code associated with each suspended thread) is patched so that when execution is resumed each method will suspend itself at the next safe point. After all threads are suspended, the patches are removed. This technique can be described as "patching the safe points." Unfortunately, dynamic code modifications are complex and often error prone, especially on a multiprocessor. In particular, memory maps or similar data structures should be provided to encode locations where code patches are to be made and instruction caches should be flushed upon patching to ensure memory consistency. In addition, processor pipelines may stall when handling store operations that affect the instruction stream. For these reasons, applying and removing patches can impose significant overhead. Since multi-threaded computations may be particularly amenable to multiprocessor implementations, avoiding the complexity and overhead of properly handling self-modifying code is desirable.

Dynamically Allocated Memory and Safe Points

Figure 1:
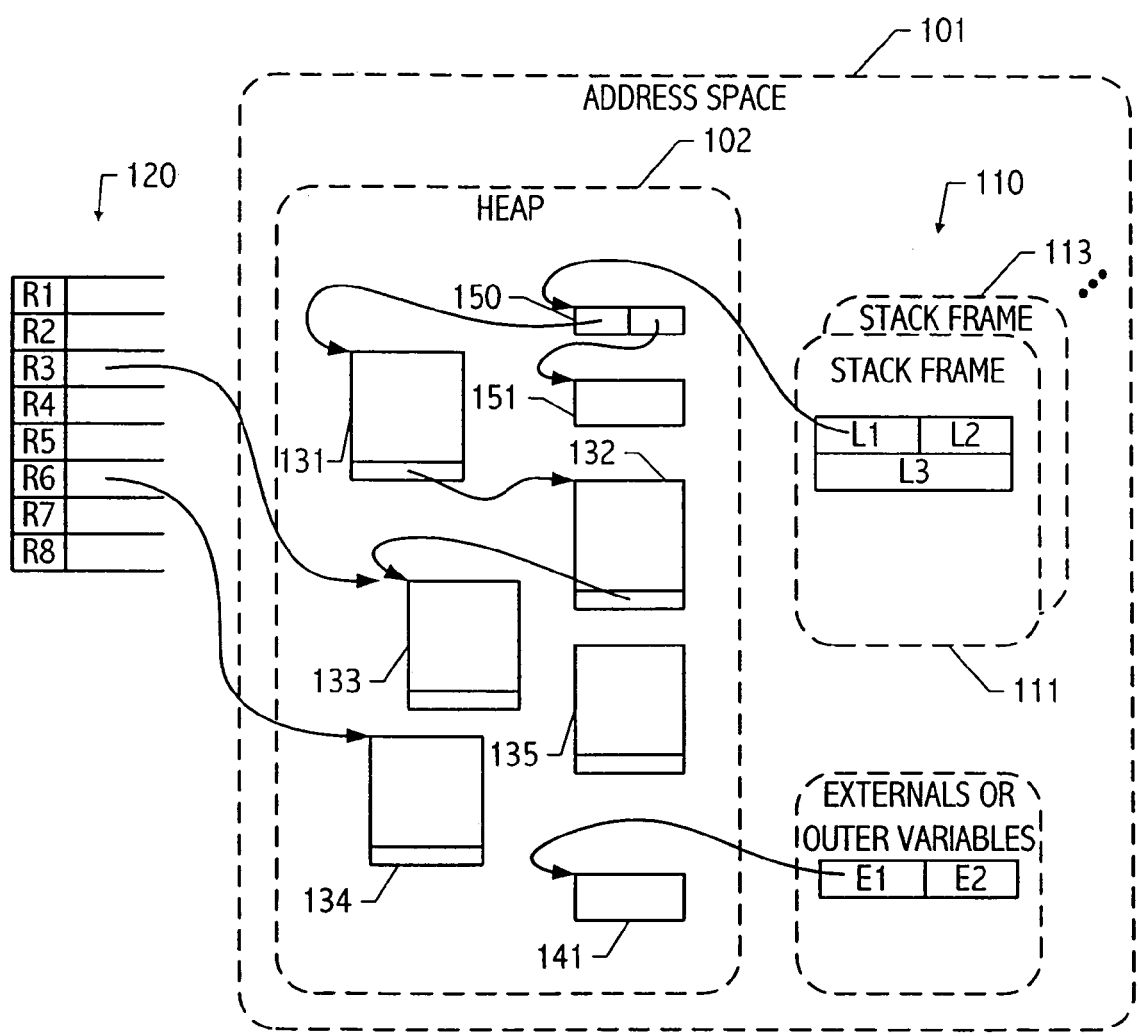
FIG. 1 depicts a referencing graph for an illustrative mutator having a root set of pointers at least partially represented in registers or stack locations.

FIG. 1 depicts a partial referencing graph for an illustrative mutator thread executing on a processor having memory referenceable as address space 101. The mutator thread is at a current function corresponding to stack frame 111 in a calling hierarchy represented as activation record stack 110. Activation record stack 110 and stack frame 111 are described in greater detail below. A register context 120 is associated with the current function. Register context 120 may be a full set of machine registers available to the mutator thread or a window into a subset of machine registers allocated to the current function. A portion of address space 101 is dynamically allocable as heap 102. Individual memory objects (e.g., objects 150, 151, 131, 132, 133, 134 and 141) are dynamically allocated from heap 102 and, in the referencing graph of FIG. 1, are currently reachable by a set of pointers including local variable L1, external or outer variable E1, and contents of registers R3 and R6 of register context 120. Register context 120 may include a portion organized as a stack. In some configurations, a register context and frame for a particular function may be combined in a unified storage arrangement.

Memory object 135 represents dynamically allocated storage that is no longer reachable and will be collected and returned to a free space pool of heap 102 by garbage collection. Referencing graphs for pointers represented in other stack frames in the calling hierarchy (e.g., stack frame 113) or represented in other register contexts are omitted for clarity and only the partial referencing graph associated with the current function is shown. However, based on the description herein, persons of ordinary skill in the art will appreciate that at any given point in the execution and calling sequence of the mutator thread, a complete set of reachable objects in heap 102 and a root set of pointers thereto can be defined by combining the contributions for each function in the calling hierarchy.

As described above, a root set of pointers at least partially represented in registers or stack locations necessitates some method of tracking of those registers or stack locations containing valid pointers. Tracking can be continuous with significant overhead or, more preferably, can be limited to predefined safe points in the mutator code. If predefined safe points are utilized, attractive safe points must be identified and a mechanism for suspending a mutator thread (or threads) at such safe points is needed. When a thread is suspended, all the stack frames except the most recently entered (i.e., all the calling functions in the calling hierarchy) must be at call sites, hence every call site must be a safe point. Therefore, mutator code should include information describing the registers and stack locations, if any, containing pointers at call sites.

In addition, other safe points may be defined to reduce the period during which a thread executes with garbage collection pending. For example, returns from functions or methods are another likely safe point site. To ensure that a thread will not run long with garbage collection pending, backward branches can also be designated as safe points. In general, backward branches define loops, and safe points at backward branches allow loops to be interrupted for garbage collection. A compiler may elect to place safe points elsewhere in the code it generates, for example in a method's prolog to prevent recursive code from holding up garbage collection indefinitely. In some embodiments in accordance with the present invention, safe points are defined at call sites, return sites and backward branches using an exception triggering instruction. For example, in one exemplary embodiment now more completely described, the exception triggering instruction may be encoded in a delay slot of a delayed branch instruction providing the call, return, or backward branch.

Delay Slot Encoded Instructions Referencing a Global Store

In an exemplary embodiment in accordance with the present invention, safe points are defined at selected sites coinciding with delayed control transfer instructions in potentially inconsistent threads of a mutator computation. Exception triggering instructions are encoded in delay slots of the delayed control transfer instructions. In embodiments suitable for certain processor architectures (including for processors conforming to the SPARC® V9 architecture), calls, returns, and backward branches are all implementable using delayed control transfer instructions. As a result, safe points can be defined in mutator code to coincide with each type of delayed control transfer instruction and thread suspension can be provided for each such safe point using suspension exception and trap handling mechanisms described herein.

SPARC architecture based processors are available from Sun Microsystems, Inc, Palo Alto, Calif. SPARC trademarks are used under license and are trademarks or registered trademarks of SPARC International, Inc. in the United States and other countries. Products bearing SPARC trademarks are based upon an architecture developed by Sun Microsystems.

In other embodiments, including those suitable for other processor architectures, different sets of safe points may be defined. For example, and without limitation, call-site only or call-site and backward branch safe point only strategies may be employed. In addition to the safe point location described above, safe points may be defined within method prologs and/or within memory allocators. Additionally, safe point sets may be implemented where some of the safe points are supported using delay slot encoding of exception triggering instructions and others are supported using other thread suspension mechanisms. For example, one suitable complementary thread suspension mechanism is described in greater detail in U.S. patent application Ser. No. 09/229,272, entitled "THREAD SUSPENSION SYSTEM AND METHOD," the entirety of which is incorporated herein by reference. Based on the description herein, persons of ordinary skill in the art will appreciate implementations suitable for a wide variety of processor instruction sets supporting delayed branch encodings and for a wide variety of safe point definitions.

Figure 2:
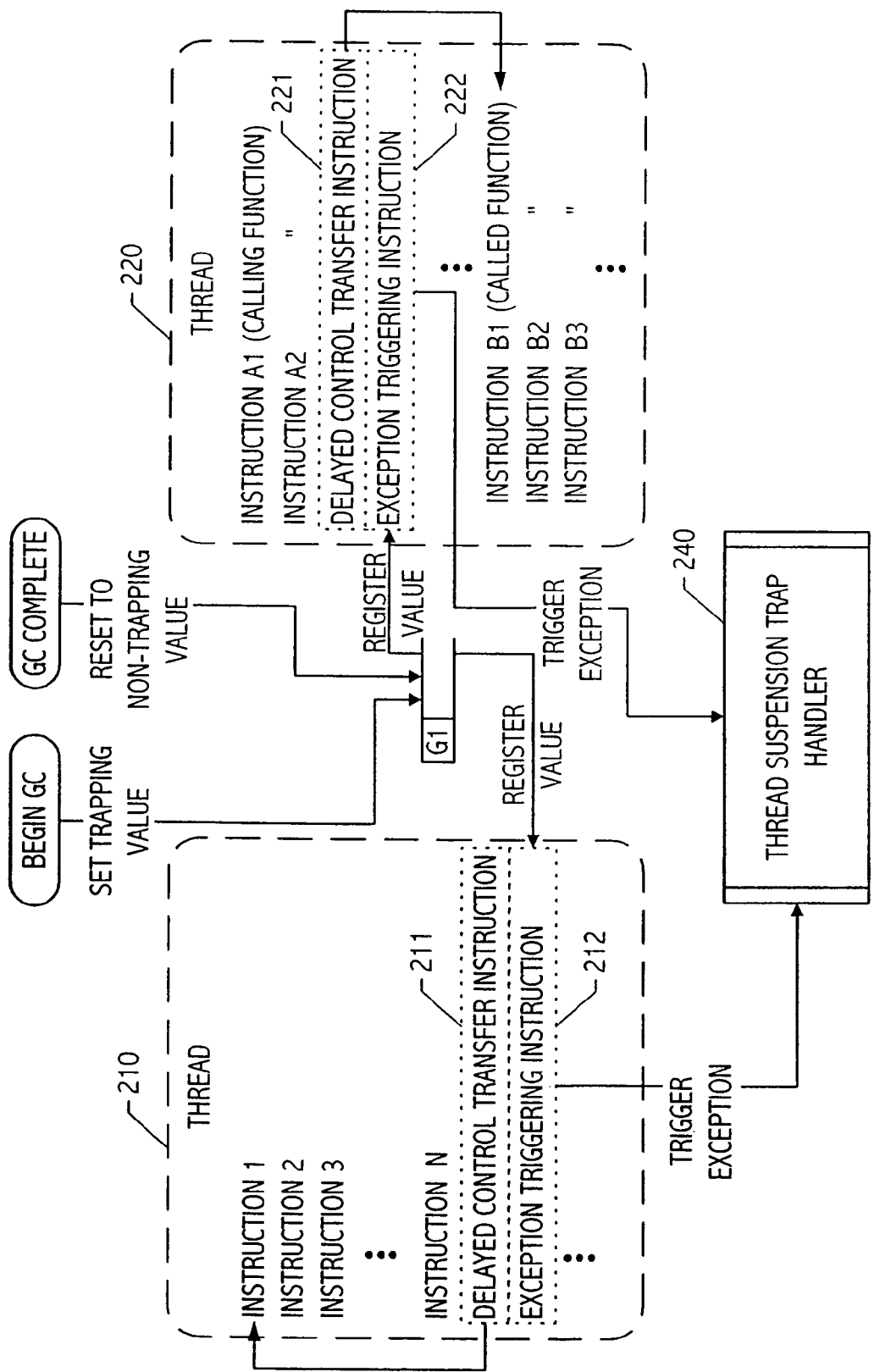
FIG. 2 depicts interactions between a global register and two illustrative threads of a mutator, each including an exception triggering instruction in a delay slot of a delayed control transfer instruction in accordance with an exemplary embodiment of the present invention.

Focusing illustratively on an exemplary embodiment in accordance with the present invention, safe points are defined at call sites, return sites and backward branches and exception triggering instructions are encoded in delay slots of delayed branch instructions providing a call, return, or backward branch for potentially inconsistent threads of a mutator computation. FIG. 2 illustrates execution sequences of instructions corresponding to two threads (210 and 220) of a mutator computation. Thread 210 includes a delayed control transfer instruction 211 encoding a backward branch (e.g., as part of a loop construct). An exception triggering instruction 212 is encoded in the delay slot of delayed control transfer instruction 211. In the embodiment of FIG. 2, exception triggering instruction 212 references a value (potentially an exception triggering value) from global register G1. Thread 220 includes a delayed control transfer instruction 221 encoding a call and an exception triggering instruction 222 is encoded in the delay slot thereof. Exception triggering instruction 222 also references the value from global register G1. Although only a single delayed control transfer instruction and corresponding exception triggering instruction are illustrated for each thread, it will be understood that large numbers thereof are included in the execution sequence of instructions for a typical thread.

Normally, i.e., when garbage collection is not pending, global register G1 contains a value that, when referenced by an exception triggering instruction (e.g., 212 or 222), does not trigger an exception or invoke a thread suspension trap handler. On the other hand, when garbage collection is desired or becomes necessary, a trapping value is set in global register G1. Thereafter, when thread 210 encounters an exception triggering instruction referencing the trapping value in global register G1, an exception is triggered and thread suspension trap handler 240 is invoked. After all potentially inconsistent threads are suspended, the value in global register G1 may be reset to a non-triggering value.

Although thread suspension mechanisms described herein are applicable to a wide variety of processor architectures, instruction sets and execution environments, they can be better understood in the context of a specific exemplary configuration. It is noted that the Java™ virtual machine is one example of a garbage collected execution environment and the SPARC architecture is merely one exemplary processor architecture. The framework established by each is useful for illustrating an application of the inventive concepts described herein; however, the invention is in no way limited to Java™ environments, virtual machine environments, or SPARC processors. Indeed, as will be appreciated based on the claims that follow, application of the inventive concepts described herein is not limited to garbage collection. Therefore, without limitation to the specific instructions, data stores, trapping values or exception handling configuration thereof, an exemplary configuration for a SPARC-V9 architecture microprocessor running a Java™ virtual machine environment is now described.

In the SPARC architecture, a control transfer instruction functions by changing the value of the next program counter (nPC) or by changing the value of both the program counter (PC) and the next program counter (nPC). When only nPC is changed, the effect of the transfer of control is delayed by one instruction cycle. Most control transfers in SPARC-V9 (including conditional and unconditional branches, calls, jumps and returns) are of the delayed variety. The instruction following a delayed control transfer instruction is said to be in the delay slot of the control transfer instruction and is executed (unless the control transfer instruction annuls it) before control is transferred to the target instruction. In general, delayed control transfers have been used for avoiding stalls in the execution pipeline(s) of a processor by allowing a compiler to move an instruction having execution sequence position before the control transfer into the delay slot, thereby avoiding a stall associated with fetch, decode, etc. of the control transfer target.

In various embodiments in accordance with the present invention, delay slots are also used to support thread suspension by placing an exception triggering instruction in delay slots of delayed control transfer instructions coinciding with safe points. For example, on a SPARC processor, trapping versions of tagged arithmetic instructions (e.g., TADDccTV or TSUBccTV) can be used to trigger a thread suspension trap. The tagged add and subtract instructions operate on tagged-format data, in which the tag is the two low-order bits of each operand. If either of the operands has a nonzero tag, a tag mismatch is detected and a tag_overflow exception is triggered. Building on these facilities, a compiler can place a tagged arithmetic instruction (e.g., TADDccTV) in the delay slot of each control transfer instruction that coincides with a safe point. The tagged arithmetic instruction operates on the contents of a global register, e.g., global register G1. In the SPARC architecture, two sets of global registers are defined, one of which is selected by the state of the PSTATE.AG register field. Therefore, the compiler should either ensure that all potentially inconsistent mutator threads address the same global register set, or alternatively, that the global register sets associated with all potentially inconsistent mutator threads encode consistent global register values (e.g., a consistent trapping or non-trapping value in the global register G1 instances of both register sets).

A garbage collected execution environment, such as that implemented by a Java™ virtual machine, can be configured to set a global register accessible to each mutator thread and referenced by the tagged arithmetic instructions (e.g., global register G1) with a trapping value (e.g., xxx . . . x01 for the TADDccTV instruction) when collection is required or desired and to configure the Trap Table entry (tt=$023_{16}$) corresponding to the tag_overflow exception to invoke a thread suspension trap handler.

In an exemplary Java™ virtual machine implemented on a SPARC processor, the Java™ virtual machine clears, typically on startup or process creation, global register G1 which is referenced by tagged arithmetic instructions placed by a Java™ compiler into delay slots of control transfer instructions coinciding with safe points in mutator code. In addition and typically on startup or process creation, the Java™ virtual machine associates thread suspension trap handler 240 with the tag_overflow exception. When garbage collection is desired or necessary, the Java™ virtual machine sets a tag bit in global register G1. Thereafter, when mutator threads (e.g., threads 210 and 220) encounter safe points (e.g., at backward branches, calls, returns, etc.) execution of the delay slot tagged arithmetic instructions triggers a tag_overflow exception and invokes thread suspension trap handler 240. Thread suspension trap handler 240, in turn, suspends the trapping mutator thread. Once all mutator threads are suspended, the Java™ virtual machine can clear the tag bit (or bits) set in global register G1 and can perform garbage collection in accordance with any suitable automatic storage management system implemented thereby.

Detection of an all-threads-suspended condition may be performed by thread suspension trap handler 240 or alternatively may be a function of a particular collector implementation. In addition, one or more threads of a multi-threaded mutator may be guaranteed consistent whenever active, during certain phases of activity, or while executing certain functions. In such circumstances, the guaranteed consistent threads may be suspended without regard to a next safe point. In essence, all points are safe points in a guaranteed consistent thread. As a result, suspension of guaranteed consistent threads may be performed outside of the context of mechanisms described herein, while mechanisms described herein may be employed for those threads that are potentially inconsistent. In such circumstances, suspension of at least potentially inconsistent threads should be detected. Suspension of guaranteed consistent threads may be performed at any time after collection is required or desired; however, in certain configurations it may be profitably delayed until all potentially inconsistent threads are suspended. In either case, suspension of guaranteed consistent threads may be performed by mechanisms described herein or otherwise (e.g., by a particular collector implementation).

In the SPARC processor architecture, association of thread suspension trap handler 240 with a particular exception involves a trap table entry, although other processor architectures may employ differing exception handling configurations and suitable modification will be apparent to persons of ordinary skill in the art based on the description herein. In the SPARC processor architecture, a trap table is defined and is indexed using a trap type indication to vector to the associated handler code. The first eight instructions of a trap handler can be encoded in the trap table entry itself. Therefore in some embodiments, instructions of thread suspension trap handler 240 are encoded in a trap table entry and vectoring thereto is via the trap type index. For thread suspension trap handlers numbering more than 8 instructions, an additional vector to handler code is encoded in the trap table entry.

Many implementations of a thread suspension trap handler are suitable. However, generally speaking, thread suspension trap handler code should obtain the location of the trap (TPC [TL] on a SPARC processor) and save it. The saved trap location can then be used by a garbage collector to select the proper map of registers and/or stack locations containing pointers.

Although the tagged arithmetic instructions are attractive as exception triggering instructions because they can typically be employed by the compiler solely for thread suspension and therefore without regard for conflicting usage of the tag_overflow exception, other exception triggering functions can also be employed in delay slots with suitably-configured exception handler facilities. In general, suitable exception triggering instructions will be of a type that generates precise (rather than imprecise) traps. Preferably, the selected exception triggering instruction is not employed for purposes other than thread suspension in the mutator code. However, if the selected exception triggering instruction is used for purposes in addition to thread suspension, corresponding modifications may be made to trap handler code. In such cases, handler code will need to distinguish between thread suspension-related usage of the corresponding exception and other usage thereof, e.g., by checking a safe point list to determine whether a trapping location is a safe point and, if so, branching to thread suspension trap handling. Depending on the specific configuration, discriminator code in a first-level trap handler or single unified trap handler and/or opportunistic installation of an alternate handler may be suitable. Suitable modifications for particular processors, instruction sets and execution environments will be apparent to persons of ordinary skill in the art based on the description herein.

In one specific exemplary embodiment in accordance with FIG. 2, exception triggering instructions 212 and 222 include TADDccTV instructions, storage referenced thereby includes a global register G1, and suspension of mutator thread(s) is by a thread suspension trap handler 240 triggered in response to a tag_overflow exception. In other embodiments in accordance with the present invention, specific instructions, data stores, trapping values and exception handling configurations may differ and suitable modifications will be apparent to persons of ordinary skill in the art based on the description herein. For example, and without limitation, trap instructions referencing a condition code associated with thread context and settable in response to a garbage collection desired or necessary event may be utilized in delay slots to similarly suspend mutator threads at safe points.

Delay Slot Encoded Trap Instructions

Another exemplary embodiment in accordance with the present invention employs a trap instruction as a delay slot instruction referencing storage encoded with a trapping value. As before, safe points are defined at selected sites coinciding with delayed control transfer instructions in potentially inconsistent threads of a mutator computation. However, trap instructions rather than tagged arithmetic instructions are encoded in delay slots of the delayed control transfer instructions and a corresponding exception is employed for triggering a thread suspension trap handler. By using the storage local to a mutator thread for an exception triggering value, trap instruction based embodiments can avoid dedication of a global register to thread suspension. In one embodiment in accordance with the present invention, condition codes are defined as part of a thread's state and a trap instruction triggers an exception based on condition code state.

As before, although thread suspension mechanisms described herein are applicable to a wide variety of processor architectures, instruction sets and execution environments, they can be better understood in the context of a specific exemplary configuration. Therefore, without limitation to the specific instructions, data stores, trapping values or exception handling configuration thereof, an exemplary trap instruction based configuration is described in the context of the SPARC-V9 feature set.

The SPARC architecture defines a Condition Codes Register (CCR) and a Trap on condition codes (Tcc) instruction. As presently defined, the condition codes register includes an integer condition codes field (icc) and an extended integer condition codes field (xcc). A selection field in valid Tcc instructions selects between the icc and the xcc fields for evaluation of a specified trap condition. See generally, Weaver and Germond, The SPARC Architecture Manual Version 9, Prentice-Hall, Inc. (1994), pp. 237-238. In one embodiment in accordance with the present invention, an extra 4-bit garbage collection condition code field (gcc) is defined in the condition codes register (bits 0-3 are currently used for the integer condition codes and bits 4-7 for the extended condition codes) and a selection value is defined for selection of gcc for evaluation of a trap condition specified in a Tcc instruction. In this way, a trap on garbage collection condition code facility is provided in the context of an augmented Tcc instruction. Unlike a global register, the state of a condition codes register is maintained on a per-thread basis, with per-thread values residing in machine registers when that thread is executing. Therefore, to set a trapping value in the "condition codes register" for each thread of a multi-threaded mutator, the condition code register state associated with each mutator thread should be set to a trapping value. A modified WRite Condition Codes Register (WRCCR) instruction (modified to also write the gcc field) can be used to set a trapping value in the condition code register state associated with a current mutator thread.

When a Tcc instruction is executed with condition codes register state encoding a trapping value, a trap_instruction exception is triggered and a handler associated with a corresponding trap table entry is invoked. In the context of a SPARC V9 style trap handling mechanism, multiple trap table entries are defined for trap_instruction exceptions, each corresponding to a specific trap operation (one of 16 for both icc- and xcc-denominated trap operations). Building on this mechanism, plural trap table entries for gcc-denominated trap operations can also be defined, although even a single gcc-denominated trap operation and associated trap table entry would be suitable. As before, a thread suspension trap handler (e.g., thread suspension trap handler 240) is associated with the trap table entry (or entries).

Building on these facilities, a compiler can place a trap on garbage collection condition codes instruction (e.g., a Tcc referencing the gcc field) in the delay slot of each control transfer instruction that coincides with a safe point. The trap on garbage collection condition codes instruction references (as storage for a trapping value) the gcc field of the condition codes register.

A garbage collected execution environment, such as a Java™ virtual machine, can be configured to set the gcc field for each mutator thread with a trapping value (e.g., xxx1 for a Tcc instruction trapping on the lowest order, or "c", bit of the gcc field) when collection is required or desired and to configure (typically on startup or process creation) the Trap Table entry corresponding to the trap_instruction exception for the specified gcc condition to invoke a thread suspension trap handler. For each mutator thread, such a Java™ virtual machine clears the gcc field referenced by trap on garbage collection condition codes instructions placed by a Java™ compiler into delay slots of control transfer instructions coinciding with safe points in the mutator code. When garbage collection is desired or necessary, the Java™ virtual machine sets a trapping value in the gcc field for each potentially inconsistent mutator thread. Thereafter, when mutator threads (e.g., threads 210 and 220 of FIG. 2) encounter safe points (e.g., at backward branches, calls, returns, etc.) execution of the delay slot trap instructions triggers a trap_instruction exception and invokes a thread suspension trap. The thread suspension trap handler, in turn, suspends the trapping mutator thread and clears trapping values set in the associated gcc field. Alternatively though less preferably, clearing of trapping values in each mutator thread's associated gcc field can be deferred (e.g., until after all mutator threads are suspended or until after garbage collection is performed). Once all mutator threads are suspended, the Java™ virtual machine performs garbage collection in accordance any suitable automatic storage management system implemented thereby.

Mutator Thread and Suspension Mechanism Interactions

Figure 3:
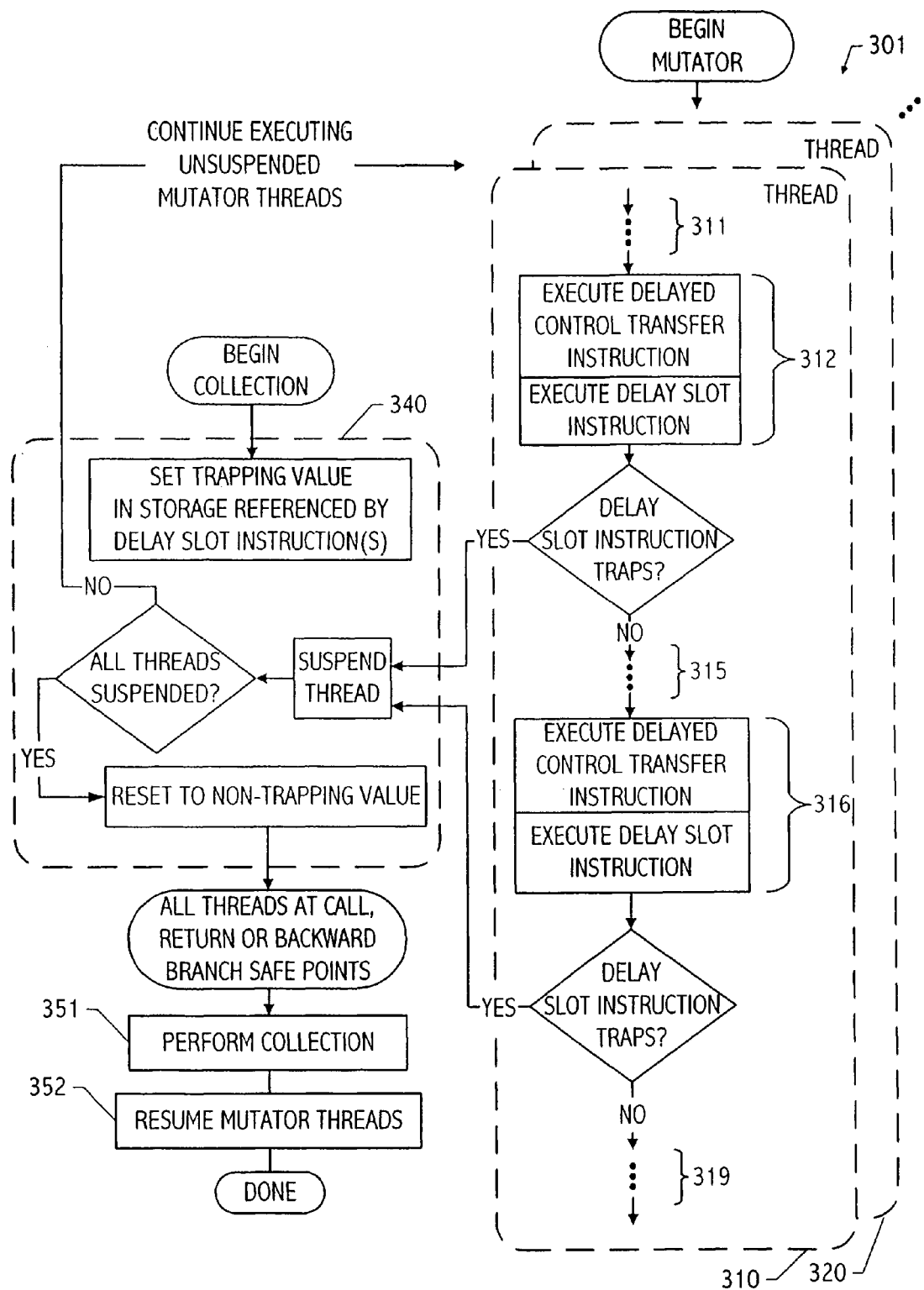
FIG. 3 depicts a flowchart of operations by illustrative threads of a mutator, a suspension exception and trap handling mechanism, and a collector, all in accordance with an exemplary embodiment of the present invention.
Figure 4:
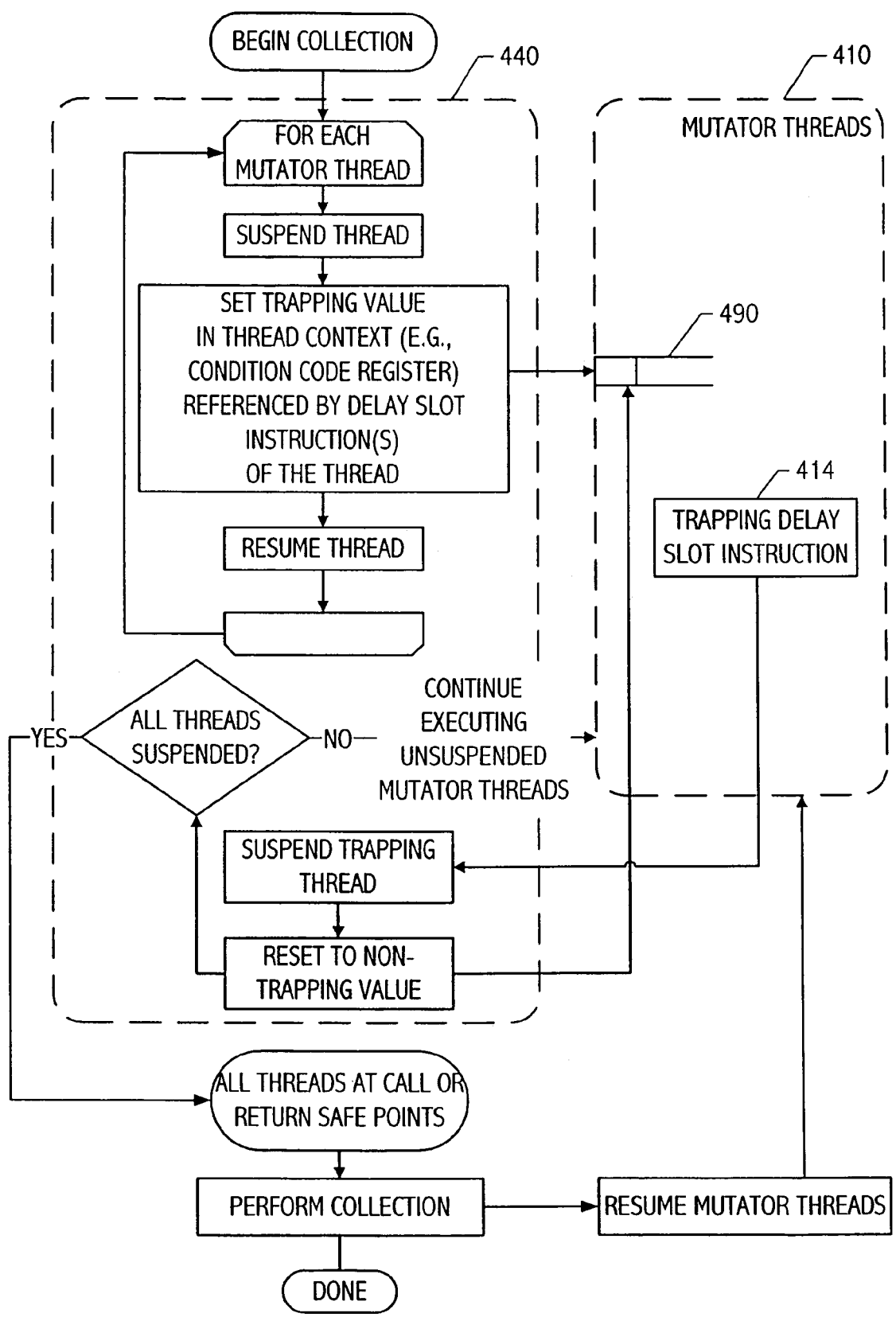
FIG. 4 depicts a flowchart of operations by a suspension exception and trap handling mechanism utilizing storage within the context of each potentially inconsistent thread in accordance with an exemplary embodiment of the present invention.
Figure 5:
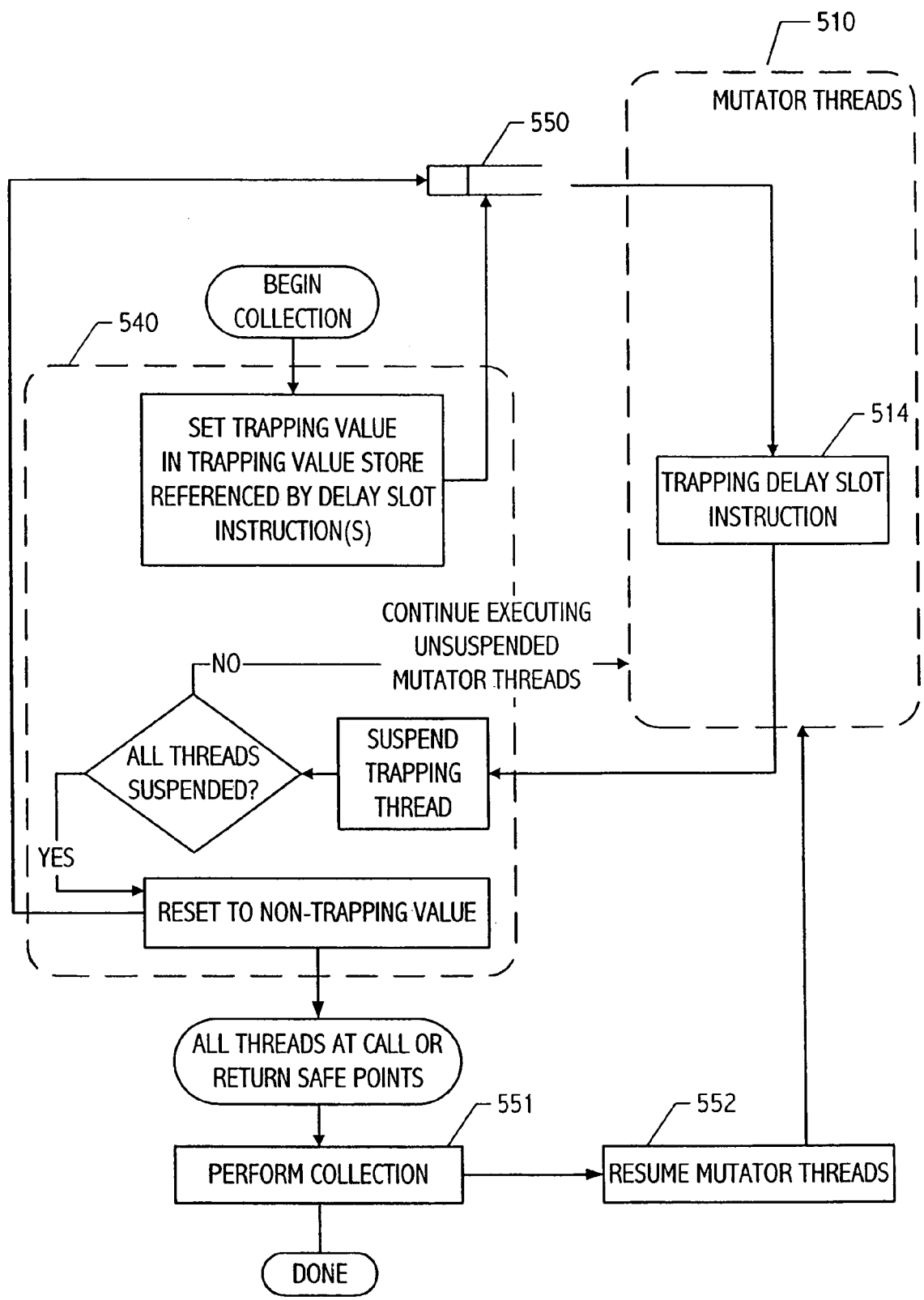
FIG. 5 depicts a flowchart of operations by a suspension exception and trap handling mechanism utilizing a global register in accordance with an exemplary embodiment of the present invention.

FIGS. 3, 4 and 5 illustrate interactions between threads of a mutator and a suspension exception and trap handling mechanism in accordance with various exemplary embodiments of the present invention. In FIG. 3, a pair of potentially inconsistent mutator threads 310 and 320 comprising mutator process 301 when executing on a computer (not shown) interacts with a suspension exception and trap handling mechanism 340 to suspend threads 310 and 320 at safe points coinciding with control transfer/delay slot instruction pairs (e.g., 312 and 316). An execution sequence of instructions (e.g., instructions 311 . . . instructions 315 . . . instructions 319 . . . ) includes control transfer/delay slot instruction pairs. At least some of these control transfer/delay slot instruction pairs (e.g., 312 and 316) include delay slot instructions selected to reference trapping value storage, while others may not. Those instruction pairs including delay slot instructions selected to reference trapping value storage coincide with safe points in the mutator code.

Depending on the execution environment in which mutator process 301 executes, trapping value storage may include a register, stack location, field or memory location such as a global register G1 (see e.g., FIG. 2) accessible to both threads 310 and 320. Alternatively, trapping value storage may include multiple instances of a register, stack location, field or memory location such as a condition code register field (described above), where each instance is associated with a particular thread (or subset of threads). In either case, when collection is desired or necessary, storage is set with a trapping value (or trapping values) by suspension exception and trap handling mechanism 340. As a thread executes, the trapping value storage is referenced by the trapping delay slot instructions (e.g., tagged arithmetic instructions, trap on condition code instructions, or other instructions selected to trigger an exception). If a trapping value has been set, then suspension exception and trap handling mechanism 340 suspends the trapping thread. Unsuspended potentially inconsistent threads continue executing until they too execute a trapping delay slot instruction and are themselves suspended. After all potentially inconsistent mutator threads have been suspended, garbage collection is performed (351) and thereafter mutator threads are resumed (352).

For simplicity, the description herein presumes that all potentially inconsistent mutator threads including 310 and 320 allocate from, and reference storage in, a unified heap. Therefore, garbage collection is performed after all potentially inconsistent threads that reference the heap are suspended. Nonetheless, configurations are possible in which a mutator process includes distinct subsets of threads referencing storage in distinct portions of a heap or in distinct heaps. In such configurations, all threads of the mutator process need not be suspended before a portion of the heap or a distinct heap is garbage collected. Proper selection of subsets of threads for suspension in such circumstances will be apparent to persons of ordinary skill in the art based on the description herein.

FIG. 4 illustrates interactions between threads 410 of a mutator process and a suspension exception and trap handling mechanism 440 wherein instances of trapping value storage are associated with the threads. In one embodiment in accordance with FIG. 4, trapping value storage includes gcc fields of condition code register states associated with thread contexts (as described above), although other trapping value stores are also suitable. Instruction sequence detail of mutator threads 410 is similar to that depicted in FIG. 3 and has been omitted for clarity.

When collection is desired or necessary, storage is set with a trapping value (or trapping values). In exemplary embodiments in accordance with the present invention, each thread is suspended, a trapping value written into thread local storage 490 and the thread is resumed. Because instances of trapping value storage are associated with mutator threads and because in typical uniprocessor implementations, a single thread at a time is executed, suspension exception and trap handling mechanism 440 successively brings each thread into memory by suspending the thread. For other implementations, including e.g., those for multiprocessors executing multiple threads, thread suspension and subsequent resumption may be avoided. Execution of a trapping delay slot instruction 414 referencing the trapping value store causes an exception that is handled by a suspension trap handler (not separately shown) of suspension exception and trap handling mechanism 440, whereupon the trapping thread is suspended and the trapping value store associated with the trapping thread is reset to a non-trapping value. In some embodiments, resetting of the trapping value store is performed by the suspension trap handler, while in others, the resetting may be more closely tied to performance or completion of garbage collection or to eventual resumption of mutator threads after garbage collection.

FIG. 5 illustrates interactions between threads 510 of a mutator process and a suspension exception and trap handling mechanism 540 wherein a trapping value store 550 is referenced by trapping delay slot instructions 514 of each potentially inconsistent thread of threads 510. In one embodiment in accordance with FIG. 5, trapping value store 550 includes a global register, stack or memory location (e.g., global register G1, as described above with reference to FIG. 2), although other trapping value stores are also suitable. Instruction sequence detail of mutator threads 510 is similar to that depicted in FIG. 3 and has been omitted for clarity.

When collection is desired or necessary, trapping value store 550 is set with a trapping value. Execution of a trapping delay slot instruction 514 referencing trapping value store 550 causes an exception that is handled by a suspension trap handler (not separately shown) of suspension exception and trap handling mechanism 540, whereupon the trapping thread is suspended. Once all potentially inconsistent threads referencing heap storage or a distinctly collected portion thereof are suspended, garbage collection is performed (551) and thereafter the suspended mutator threads are resumed (552). In some embodiments, resetting of trapping value store 550 is performed by the suspension trap handler, while in others, the resetting may be more closely tied to performance or completion of garbage collection or to eventual resumption of mutator threads after garbage collection.

Mutator Code Preparation

Figure 6:
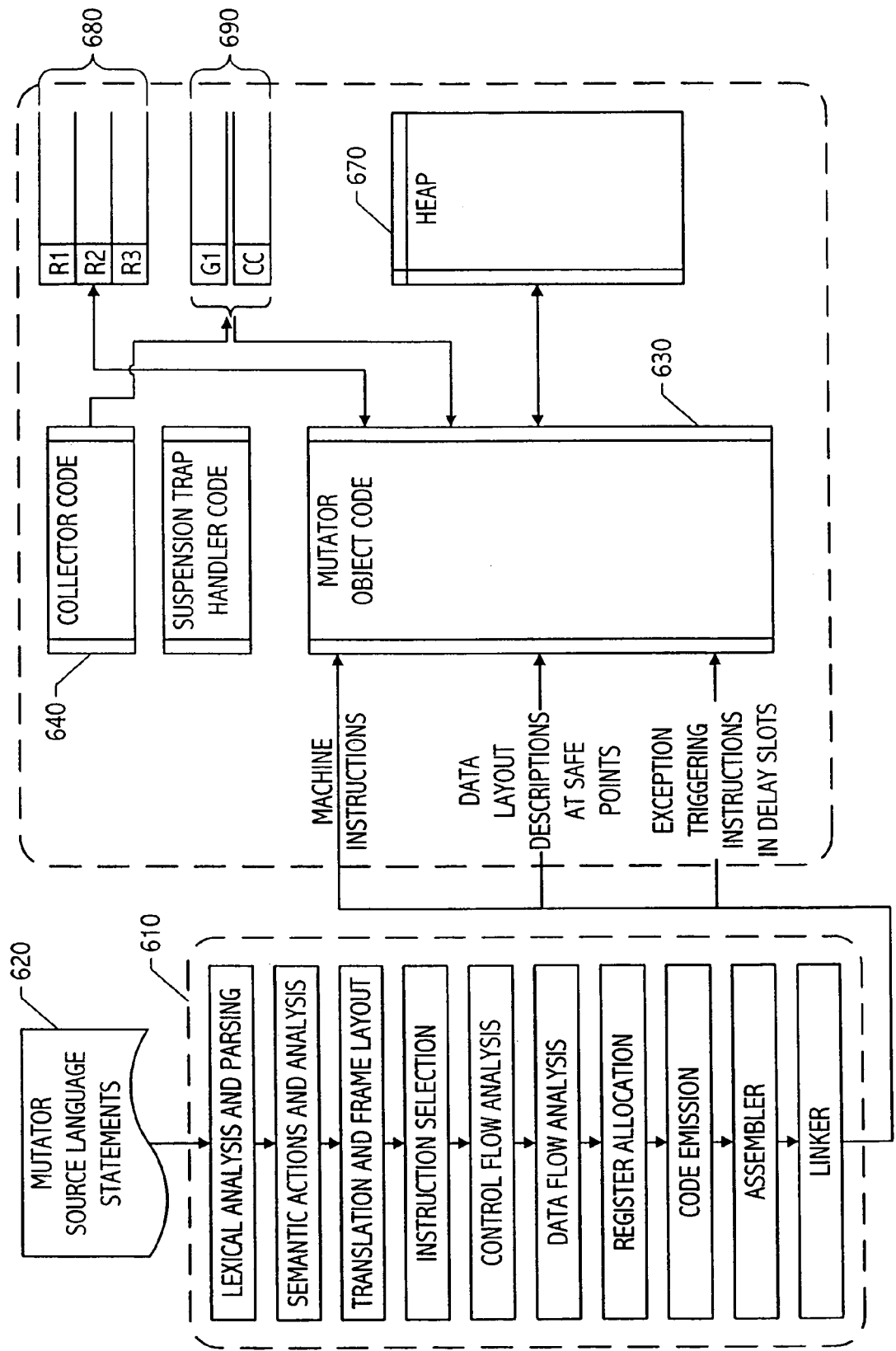
FIG. 6 depicts a flowchart illustrating preparation by a compiler of mutator object code (including data layout descriptions at safe points and exception triggering instructions) and interaction of such code, collector code and suspension trap handler code with root set storage (including data registers and heap storage) and suspension triggering value storage, all in accordance with an exemplary embodiment of the present invention.

A variety of execution environments and mutator code instruction selections have been described herein. FIG. 6 depicts a flowchart illustrating preparation by a compiler of mutator object code and interaction of such code, collector code and suspension trap handler code with root set storage and trapping value storage, in accordance with various exemplary embodiments of the present invention. Compiler 610 is illustrative of functions performed by mutator code preparation facilities including traditional batch mode compiler implementations as well as just-in-time (JIT) compiler implementations, though JIT compiler implementations may omit some functions, such as lexical analysis, and also include a tighter coupling with actual execution of compiled code. Other mutator code preparation facilities, including other compilers, may implement differing sets and/or sequences of operations while still providing mutator code with thread suspension facilities in accordance with the various embodiments described herein.

In any case, compiler 610 (as an exemplary mutator code preparation facility) takes a source language encoding 620 of mutator process instructions (e.g., Java language statements, "C" or "C++" source code, etc.) and performs operations to generate executable mutator code 630 (e.g., SPARC machine code, other processor object code, Java virtual machine bytecodes, etc.). In some embodiments, source language encoding 620 includes instructions encoded in computer readable media or received incrementally or in toto via communication media such as a local area, wide area or telecommunications network.

In any case, compiler 610 (as an exemplary mutator code preparation facility) takes a source language encoding 620 of mutator process instructions (e.g., Java™ language statements, "C" or "C++" source code, etc.) and performs operations to generate executable mutator code 630 (e.g., SPARC machine code, other processor object code, Java™ virtual machine bytecodes, etc.). In some embodiments, source language encoding 620 includes instructions encoded in computer readable media or received incrementally or in toto via communication media such as a local area, wide area or telecommunications network.

Mutator code 630 includes machine instructions corresponding to source language encoding 620 as well as exception triggering instructions placed in delay slots or control transfer instructions by compiler 610 and data layout descriptions at safe points, all as described above with respect to various embodiments. As described above, compiler 610 emits information descriptive of those registers 680, heap 670 storage locations and/or, in some embodiments, stack locations (not shown) containing live pointers at safe points in mutator code 630, such that collector code 640 can ascertain the root set of pointers. In an exemplary JIT compiler implementation generating exact VM object code for a SPARC processor, the following source code:

```
/* -------------------------------------------------------------
 */
class smap {
    public static void main(String a[ ]) {
        Object x=new Object( );
        int y=3;
        String z=a[0];
        smap q=new smap( );
        q.foo(x,y,z);
    }
    void foo(Object a, int b, String c) { }
    smap( ) { }
}
``` generates the following JIT output:

```
/* -------------------------------------------------------------
 */
/* *** JIT output *** */
/* *** format:
    <bytecode-index> <bytecode> {bytecode-argument}
        {SPARC instruction}
    Stack map: sparcPC=<relative-pc-of-instruction-with-map>
        {SPARC instruction} *** */
DYNAMICALLY COMPILING smap.main == MethodEntry
        save %sp, 0, %sp
        st %g0, [%sp – 4096]
        lduw [%fp + 64], %g2
        st %g2, [%sp + 64]
    0 new bb 0001
        sethi %hi(0xb4000), %ol
    Stack map: sparcPC=20
        call 5
        lduw [%sp + 64], %o0
        or %o0, 0, %I0
    3 dup 59
    4 invokespecial b7 0003
        or %g0, %I0, %o0
        lduw [%o0 + 0], %g0
    Stack map: sparcPC=40
        call a
        nop
    7 astore_1 4c
        or %g0, %I0, %i0
    8 iconst_3 06
    9 istore_2 3d
        or %g0, 3, %i2
    10 aload_0 2a
    11 iconst_0 03
    12 aaload 32
        lduw [%i1 + 8], %I1
        subcc %g0, %I1, %g0
        tcc %icc, %g0, 5
        lduw [%i1 + 12], %I1
    13 astore_3 4e
        or %g0, %I1, %i3
```

-continued

```
    14 new bb 00 02
        sethi %hi(0x17d000), %o1
    Stack map: sparcPC=80
        call 14
        lduw [%sp + 64], %o0
        or %o0, 0, %I2
    17 dup 59
    18 invokespecial b7 00 04
        or %g0, %I2, %o0
        lduw [%o0 + 0], %g0
    Stack map: sparcPC=100
        call 19
        nop
    21 astore 3a 04
        or %g0, %I2, %i4
    23 aload 19 04
    25 aload_1 2b
    26 iload_2 1c
    27 aload_3 2d
    28 invokevirtual b6 0005
        or %g0, %i4, %o0
        lduw [%o0 + 0], %g2
        or %i3, %g0, %o3
        or %i2, %g0, %o2
        or %i0, %g0, %o1
        nop
        sethi %hi(0x4003000), %g3
    Stack map: sparcPC=140
        call 23
        nop
    31 return b1
    Method Exit
        jmpl [%i7 + 8], %g0
        restore %g0, %g0, %g0
        nop
``` where all instructions that generate maps in the above example are call-type instructions. Exemplary stack maps correspond to sparcPC values as follows:

```
/* -------------------------------------------------------------
 */
/* *** stack maps *** */
/* *** format:
    sparcPC = <relative PC of instruction with map>
        regs: {register with pointer}
        vars: {variable with pointer}
        ostk: {operand stack element with pointer}
        rcvr = <receiver>
        sig = <signature of callee> *** */
Stack maps for smap.main
    sparcPC = 20,
        regs: %i1
        vars:
        ostk:
        rcvr = 0,
        sig = (I)LR;
    sparcPC = 40,
        regs: %o0 %I0 %i1
        vars:
        ostk:
        rcvr = 1,
        sig = ( )V
    sparcPC = 80,
        regs: %i0 %i1 %i3
        vars:
        ostk:
        rcvr = 0,
        sig = (I)LR;
    sparcPC = 100,
        regs: %o0 %I2 %i0 %i1 %i3
        vars:
        ostk:
        rcvr = 1,
```

-continued

```
    sig = ( )V
sparcPC = 140,
    regs: %o0 %o1 %o3 %i0 %i1 %i3 %i4
    vars:
    ostk:
    rcvr = 1,
    sig = (Ljava/lang/Object;ILjava/lang/String;)V
sparcPC = 148,
    regs:
     vars:
    ostk:
``` where, for example, the stack map corresponding to a sparcPC value of 100 indicates that output register 0 (% o0), local register 2 (% l2), and input registers 0, 1 and 3 (% i0% i1% i3) contain pointers and where the information encoded in the sparcPC indexed stack maps is particular to a SPARC processor embodiment of a Java™ virtual machine.

where, for example, the stack map corresponding to a SparcPC value of 100 indicates that output register 0 (% o0), local register 2 (% l2), and input registers 0, 1 and 3 (% i0% i1% i3) contain pointers and where the information encoded in the sparcPC indexed stack maps is particular to a SPARC processor embodiment of a Java virtual machine.

Embodiments described herein are applicable to a wide variety of processor architectures, instruction sets and execution environments. Therefore, the specific data layout descriptions suitable for a SPARC processor are merely exemplary. Persons of ordinary skill in the art will appreciate suitable modifications for other processor architectures, instruction sets and execution environments based on the description herein.

Garbage Collectors

Collector code 640 is exemplary of any of a number of collector implementations implementing any of a number of garbage collection methods. By way of example and not limitation, two suitable tracing collector methods are now summarized. In general, tracing methods involve traversal of reference chains through memory to identify live, i.e., referenceable, memory objects. One such tracing collector method is the mark-sweep method in which reference chains through memory are traversed to identify and mark live memory objects. Unmarked memory objects are garbage and are collected and returned to the free pool during a separate sweep phase. A mark-sweep garbage collector implementation typically includes an additional field, e.g., a mark bit, in each memory object. Mark-compact collectors add compaction to the traditional mark-sweep approach. Compaction relocates live objects to achieve beneficial reductions in fragmentation.

Another tracing method, copying collection, divides memory (or a portion thereof) into two semi-spaces, one containing current data and the other containing old data. Copying garbage collection begins by reversing the roles of the two semi-spaces. The copying collector then traverses the live objects in the old semi-space, FromSpace, copying reachable objects into the new semi-space, ToSpace. After all the live objects in FromSpace have been traversed and copied, a replica of the data structures exists in ToSpace. In essence, a copying collector scavenges live objects from amongst the garbage. A beneficial side effect of copying collection is that live objects are compacted into ToSpace, thereby reducing fragmentation.

Other Embodiments

While the invention has been described with reference to various embodiments, it will be understood that these embodiments are illustrative and that the scope of the invention is not limited to them. Many variations, modifications, additions, and improvements of the embodiments described are possible. For example, while much of the description herein has been in the context of multi-threaded mutators, use of the term thread does not require multiple-threads. Indeed, non-threaded or single-threaded processes may also fall within the scope of some claims. Similarly, while delay slots of delayed control transfer instructions provide one suitable implementation, more generally, other unused instruction positions may be exploited in other implementations. For example, in variations adapted for very long instruction word-type (VLIW) architectures or more generally for processor architectures that explicitly encode instruction level parallelism, unused horizontally-encoded instruction positions may be similarly employed. As a general matter, in such explicitly parallel exploitations, a trapping instruction can be encoded as an operation executable in parallel with one or more operations that coincide with a safe point. In general, the technique may be somewhat more flexible in processor architectures that explicitly encode instruction level parallelism since suitable unused instruction positions do not presuppose a delayed control transfer instruction or delay slot. Persons of ordinary skill in the art will appreciate suitable adaptation of techniques described herein for exploitation in such processor architectures. As before, a trapping instruction can be encoded in a position that coincides with a safe point and, based on a state settable under control of a coordination facility, such as for a garbage collector, the trapping instruction selectively vectors to a thread suspension facility such as a trap handler.

In an illustrative variation suitable for processor architectures such as the MAJC™ microprocessor architecture, a conditional trap instruction may be employed. For example, in the MAJC architecture, a trapc instruction is defined that will trap to a trap handler based on whether or not a bit is set in a processor status register (PSR). Accordingly, in an exemplary MAJC architecture exploitation, a trapc instruction is used in place of a tagged arithmetic instruction and a PSR bit (e.g., PSR.tce) may be employed in place of a global register. As before, a mutator includes an instance of a trapping instruction (namely an instance of the trapc instruction) in a position coinciding with a safe point (e.g., in an otherwise unused VLIW position or slot). An execution environment that attempts to coordinate operation of multiple threads (e.g., for garbage collection) encodes an exception triggering value in an appropriate location. MAJC is a trademark of Sun Microsystems, Inc. in the United States and other countries.

Based on the techniques described herein, persons of ordinary skill in the art will appreciate exploitations suitable for a wide variety of processor architectures including pipelined, VLIW, single instruction multiple data (SIMD), multiple instruction multiple data (MIMD), and explicitly parallel instruction processor architectures. More generally, structures and functionality presented as hardware in the exemplary embodiment may be implemented as software, firmware, or microcode in alternative embodiments. These and other variations, modifications, additions, and improvements may fall within the scope of the invention as defined in the claims that follow.

What is claimed is:

1. A method of cooperative preemption for a multiprocessor, comprising:

inserting instructions in delay slots of delayed control transfer instructions at call and backward branch safe points in mutator code, stored in at least one computer readable medium, the instructions operable to selectively trigger an exception based on an indication stored in the at least one computer readable medium, the indication operable to be one of a group comprising set by a garbage collector and set for the garbage collector, the selective triggering of the exception invoking a safepoint trap handler to handle the exception, wherein mutator code comprises code that changes a state of heap-allocated storage and does not implement a garbage collection strategy;

executing the instructions utilizing at least one thread of at least one multiprocessor; and suspending the at least one thread utilizing the safepoint trap handler, the safepoint trap handler executed by the at least one multiprocessor, when the safepoint trap handler is invoked to handle the exception by the selective triggering of the exception based on the indication.

2. The method of claim 1, wherein calls and backward branches are implemented using respective instructions that selectively trigger the exception based on the settable indication.

3. The method of claim 1, further comprising:

executing the garbage collector utilizing the at least one multiprocessor.

4. The method of claim 1, wherein the instructions at call and backward branch safe points are implemented by the at least one multiprocessor as conditionally trapping instructions.

5. The method of claim 1, wherein the instructions at call and backward branch safe points are native instructions of the at least one multiprocessor which are supplied by a just-in-time (JIT) compiler based on bytecodes of a virtual machine instruction set.

6. The method of claim 5, further comprising:

executing the just-in-time (JIT) compiler utilizing the at least one multiprocessor.

7. The method of claim 1, further comprising:

inserting the instructions at return safe points in the mutator code.

8. An apparatus comprising:

at least one processor operable to concurrently execute plural threads of a mutator computation, the plural threads execute mutator code, wherein mutator code comprises code that changes a state of heap-allocated storage and does not implement a garbage collection strategy; and a safepoint trap handler, executable by the at least one processor, operable to preempt a thread of the plural threads if the thread triggers an exception that invokes the safepoint trap handler to handle the exception;

wherein the exception is selectively triggerable by execution of an instruction included in the mutator code in a delay slot of a delayed control transfer instruction that coincides with a safe point in a respective one of the mutator threads, the safe point is selected from a set comprising a call, a return and a backward branch, and the selective triggering is based on an indication settable to select preemption upon execution of the instruction.

9. The apparatus of claim 8, further comprising:

a just-in-time (JIT) compiler, executable on the at least one processor, that supplies the executable instruction that coincides with the safe point.

10. The apparatus of claim 9, wherein the just-in-time (JIT) compiler prepares instruction sequences natively executable on the at least one processor which correspond to bytecodes of a virtual machine instruction set.

11. The apparatus of claim 8, further comprising:

a garbage collector executable on the at least one processor and operable to set the settable indication.

12. A method of coordinating suspension of plural threads of a mutator, wherein the mutator comprises computation that changes a state of heap-allocated storage and does not implement a garbage collection strategy, the method comprising:

executing instructions, utilizing at least one thread of a processor, the instructions in delay slots of delayed control transfer instructions at call and backward branch safe points in mutator code, the mutator code stored in a computer readable medium, wherein mutator code comprises code that changes a state of heap-allocated storage and does not implement a garbage collection strategy;

triggering an exception on selected executions of the instructions at the call and backward branch safe points based on an indication settable operable to be one of the group comprising set by a garbage collector and set for the garbage collector, the triggering of the exception invoking a safepoint trap handler to handle the exception; and suspending the at least one thread utilizing the safepoint trap handler, the safepoint trap handler executed by the processor, when the safepoint trap handler is invoked to handle the exception by the selective triggering based on the indication.

13. The method of claim 12, further comprising:

setting the settable indication.

14. The method of claim 12, compiling virtual machine instruction set code using a just-in-time (JIT) compiler to produce corresponding sequences of instructions directly executable on the processor, the sequences including the instructions at the call and backward branch safe points.

15. A computer program product encoded in at least one computer readable medium, the computer program product comprising:

a first set of instructions, encoded in at least one computer readable medium, operable to implement, when executed by a processor, a compiler that produces native instruction sequences directly executable on the processor, the instruction sequences corresponding to mutator code encoded in accordance with a virtual machine instruction set, the native instruction sequences include particular native instructions in delay slots of delayed control transfer instructions corresponding to calls and backward branches in the mutator code, wherein mutator code comprises code that changes a state of heap-allocated storage and does not implement a garbage collection strategy; and a second set of instructions, encoded in the at least one computer readable medium, operable to implement, when executed by the processor, a safepoint trap handler, the safepoint trap handler operable to be invoked by the triggering of an exception that is selectively triggerable by execution of the particular native instructions by a thread of the processor based on an indication operable to be one of the group comprising set by a garbage collector and set for the garbage collector, the safepoint trap handler operable to suspend the thread when invoked by the selective triggering of the exception based on the indication.

16. The computer program product of claim 15, further comprising:

a third set of instructions, encoded in the at least one computer readable medium, operable to implement, when executed by the processor, the garbage collector.

* * * * *